United States Patent
Lin et al.

(10) Patent No.: US 6,979,177 B2
(45) Date of Patent: Dec. 27, 2005

(54) ROTOR ASSEMBLY

(75) Inventors: Kuo-cheng Lin, Taoyuan (TW); Wen-shi Huang, Taoyuan (TW); Hsiou-chen Chang, Miaoli (TW)

(73) Assignee: Delta Electronics, Inc., (TW)

( * ) Notice: Subject to any disclaimer, the term of this patent is extended or adjusted under 35 U.S.C. 154(b) by 0 days.

(21) Appl. No.: 10/646,025

(22) Filed: Aug. 22, 2003

(65) Prior Publication Data
US 2004/0126232 A1 Jul. 1, 2004

(30) Foreign Application Priority Data
Dec. 30, 2002 (TW) .............. 91221583 U

(51) Int. Cl.[7] .............................. F04D 29/28
(52) U.S. Cl. .............. 416/181; 416/170 R; 416/213 A; 416/244 R; 417/354; 417/423.1; 417/423.7; 417/423.8; 310/62; 310/156.26; 310/265
(58) Field of Search .................. 416/181, 213 R, 416/215 A, 244 R, 170 R, 213 A; 417/354, 417/423.8, 423.1, 423.7; 310/62, 156.12, 310/156.26, 265

(56) References Cited

U.S. PATENT DOCUMENTS

| 4,554,473 | A | * | 11/1985 | Muller ..................... 310/7 R |
| 5,663,604 | A | * | 9/1997 | Takahashi ................. 310/62 |
| 5,944,497 | A | * | 8/1999 | Kershaw et al. ......... 417/423.8 |
| 6,129,528 | A | * | 10/2000 | Bradbury et al. ........ 417/423.1 |
| 6,132,170 | A | * | 10/2000 | Horng ..................... 415/178 |
| 6,183,221 | B1 | * | 2/2001 | Hsieh .................... 417/423.12 |
| 6,318,976 | B1 | * | 11/2001 | Hsieh .................... 417/423.12 |
| 6,379,126 | B1 | * | 4/2002 | Konno ..................... 417/423.1 |
| 6,384,494 | B1 | * | 5/2002 | Avidano et al. ............ 310/58 |
| 6,394,768 | B1 | * | 5/2002 | Fukuda et al. ......... 417/423.15 |
| 6,416,300 | B1 | * | 7/2002 | Tang et al. ............ 417/423.12 |

FOREIGN PATENT DOCUMENTS

| JP | 6-86523 A | * | 3/1994 | ............ 310/156.26 |
| WO | WO-02/20994 A1 | * | 3/2002 | ............. 417/423.8 |

* cited by examiner

*Primary Examiner*—Christopher Verdier
(74) *Attorney, Agent, or Firm*—Martine Penilla & Gencarella, LLP

(57) ABSTRACT

A rotor assembly includes a housing and a hub. The housing has an open end and an opposed closed end, and is formed with a raised portion in the central location of the closed end. The hub is mounted on the closed end of the housing and covers the housing except for the raised portion to construct a thin motor.

21 Claims, 3 Drawing Sheets

ROTOR ASSEMBLY

BACKGROUND OF THE INVENTION (a) Field of the Invention

The invention relates to a rotor assembly and, more particularly, to a rotor assembly that contributes to the construction of a thin motor.

(b) Description of the Related Art

Nowadays, designers continually make an effort to reduce the size of the electrical product; for instance, the notebook gradually becomes thinner and thinner. Under the circumstance, a fan motor used for dissipating heat is designed to reduce its overall thickness when applied to the miniaturized electrical product.

A conventional design for reducing the size of a fan motor is shown in FIG. 1, where the rotor housing 104 is provided with a drive boss 104A under the hub 106, and a longitudinal notch parallel to the shaft 102 is formed. Thereby, the extended section 106A of a hub 106 can be placed in the longitudinal notch, thus providing a reduced hub diameter and further reducing the lateral width of the constructed motor structure.

However, the extended section 106A must be of such a length that it can hold a fan blade. The longitudinal notch, therefore, must be large enough to accommodate the downwardly extended section 106A, resulting in decreasing the space provided for the coil 108 and the permanent magnet 110 and thus limiting the fan motor 100 in the maximum output power.

Moreover, the hub 106 is usually made of materials with poor heat conduction such as plastic, once the top of the rotor housing 104 is fully covered with the hub 106 according to the conventional design, the hub 106 is liable to obstruct the heat-dissipation.

BRIEF SUMMARY OF THE INVENTION

It is therefore an objective of the invention to provide a rotor assembly whose shape-modified housing and hub are so arranged that the overall thickness of a fan motor can be reduced so as to construct a thin motor.

Another object of the invention is to provide a rotor assembly with high-efficiency heat dissipation.

In accordance with the invention, the rotor assembly includes a housing and a hub. The housing has an open end and an opposed closed end, and a raised portion is formed in the central location of the closed end thus creating a top portion, a periphery portion and a shoulder of the housing. The hub has a position section and a downwardly extended section, and the hub is mounted on the closed end of the housing with the position section covering the periphery portion of the housing.

Through the design of the invention, because of the formation of the raised portion, the shoulder and the periphery portion define a lateral notch where the position section of the hub is just accommodated. Hence, the thickness of the position section, which counterbalances the falling height between the top portion and the periphery portion of the housing, is taken away from the overall thickness of the fan motor so that the object of constructing a thin motor structure can be achieved.

Further, since the hub is ring-shaped and, when mounted on the housing, merely covers the periphery portion of the housing, a major portion of the housing surface is not covered with the hub. Thereby, the heat dissipation improves because heat can be removed from the uncovered housing area. In that case, the housing can further provide a plurality of apertures in the uncovered area to induce convection flows so as to facilitate the heat dissipation.

DETAILED DESCRIPTION OF THE INVENTION

Figure 1:
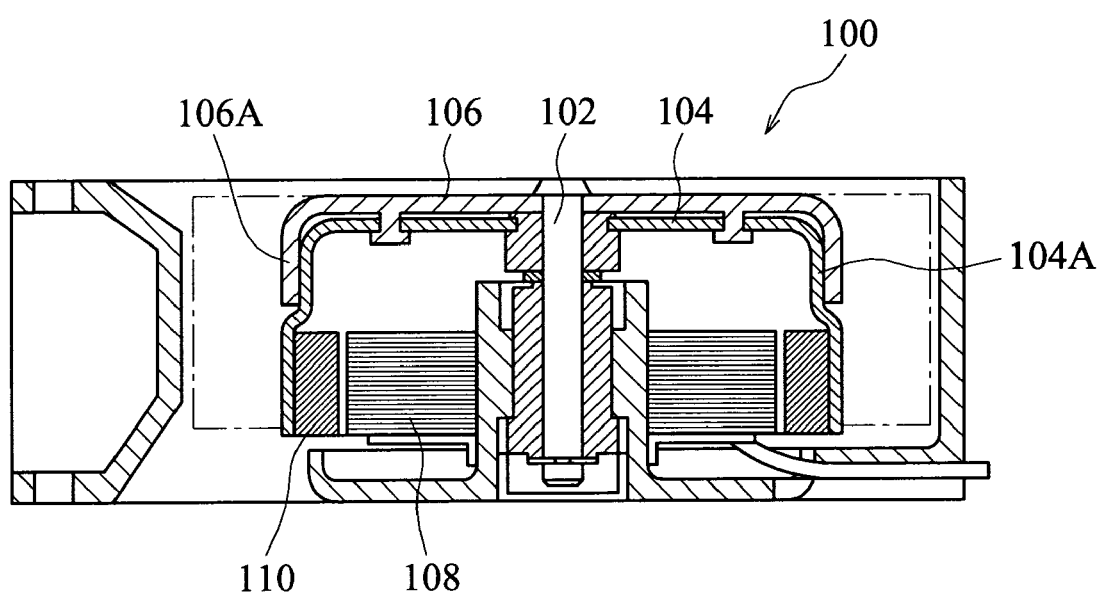
FIG. 1 is a cross-section view showing a conventional design of a rotor assembly.
Figure 2:
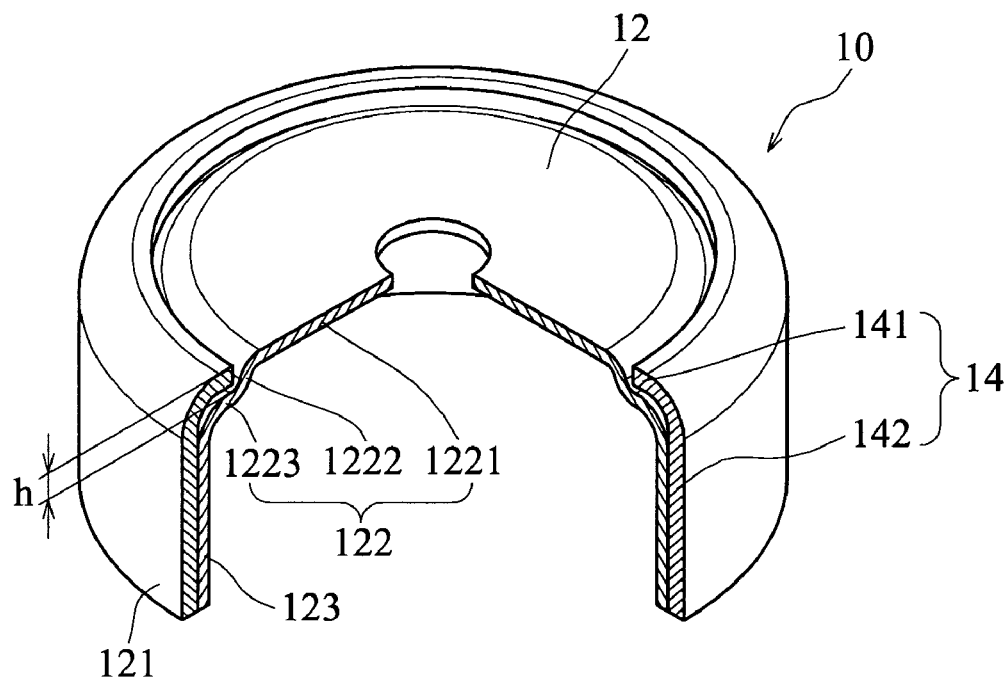
FIG. 2 is a perspective view of a rotor assembly according to an embodiment of the invention.

Referring to FIG. 2, there is shown a first embodiment of a rotor assembly 10, which includes a housing 12 and a hub 14. The substantially cup-shaped housing 12, preferably formed by metal, is open at one end, and the opposed closed end 122 that connects with a side wall 123 is formed with a raised portion in its central location. The raised portion is also substantially cup-shaped, and its formation creates a stepped closed end 122 that includes a top portion 1221, a shoulder 1222 and a periphery portion 1223. The hub 14 includes a position section 141 covering the periphery portion 1223 and an extended section 142, which is used for holding the fan blade 26, attaching to the side wall 123. The hub 14 is fixed on the housing 12 by way of adhesion.

It is observed that, because the raised portion is formed on the closed end 122 of the housing 12, a falling height h between the top portion 1221 and the periphery portion 1223 is produced. In other words, the shoulder 1222 and the periphery portion 1223 define a ring-shaped lateral notch where the position section 141 of the hub 14 can be accommodated.

Figure 3:
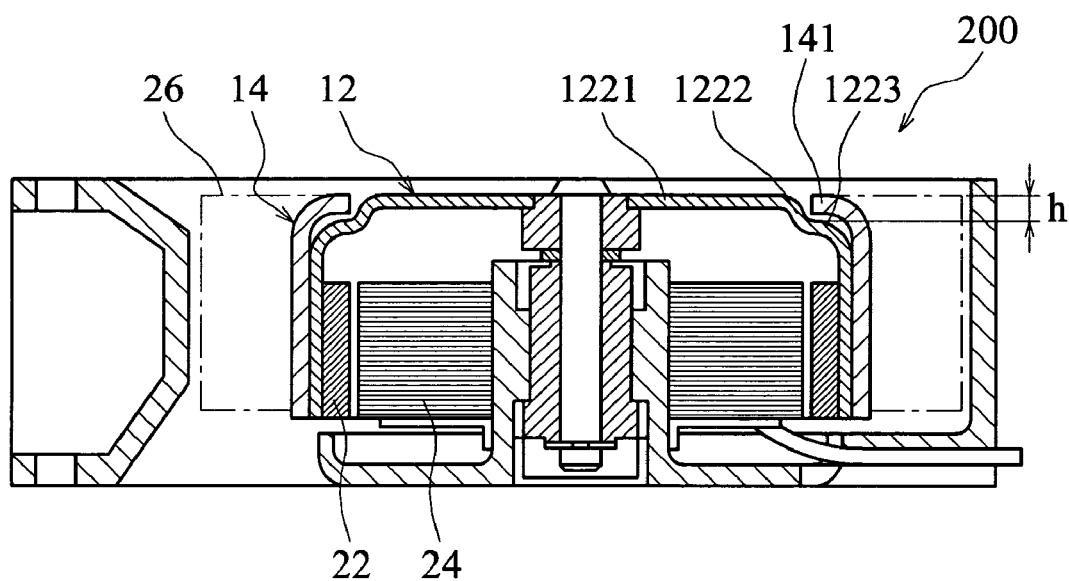
FIG. 3 is a cross-sectional view of a fan motor structure incorporating a rotor assembly according to an embodiment of the invention.

FIG. 3 is a cross-sectional view of a fan motor 200 incorporating the rotor assembly 10 of the invention, illustrating how the overall thickness of a fan motor is reduced through the design of the rotor assembly 10. Referring to FIG. 3, when the hub 14 is mounted on the housing 12, the position section 141 is accommodated into the predefined lateral notch. Therefore, the thickness of the position section 141, which counterbalances the falling height h between the top portion 1221 and the periphery portion 1223, is taken away from the overall thickness of the constructed motor structure. Thus, through the design of the shape-modified housing 12 and the way of combining the hub 14 and the housing 12 according to the invention, one can easily construct a thin motor structure without decreasing the space provided for the permanent magnet 22 and coil 24 in a fan motor.

Also, the thickness of the position section 141 is preferably equal to the falling height h, and thus the lateral notch defined by the shoulder 1222 and the periphery portion 1223 can fully accommodate the position section 141 of the hub 14.

According to the invention, the lateral notch defined by the shoulder 1222 and the periphery portion 1223 shall not, compared to the conventional design, result in the reduction of the space provided for the permanent magnet 22 and coil 24, and therefore one can construct a thin motor without limiting the fan motor in the maximum output power.

Also, since the hub 14 is in ring-shaped and, when mounted on the housing 12, merely covers the periphery portion 1223 of the housing, a major portion of the housing surface is not covered with the hub 14. Thereby, the heat dissipation improves because heat can be dissipated through the uncovered housing area.

Figure 4:
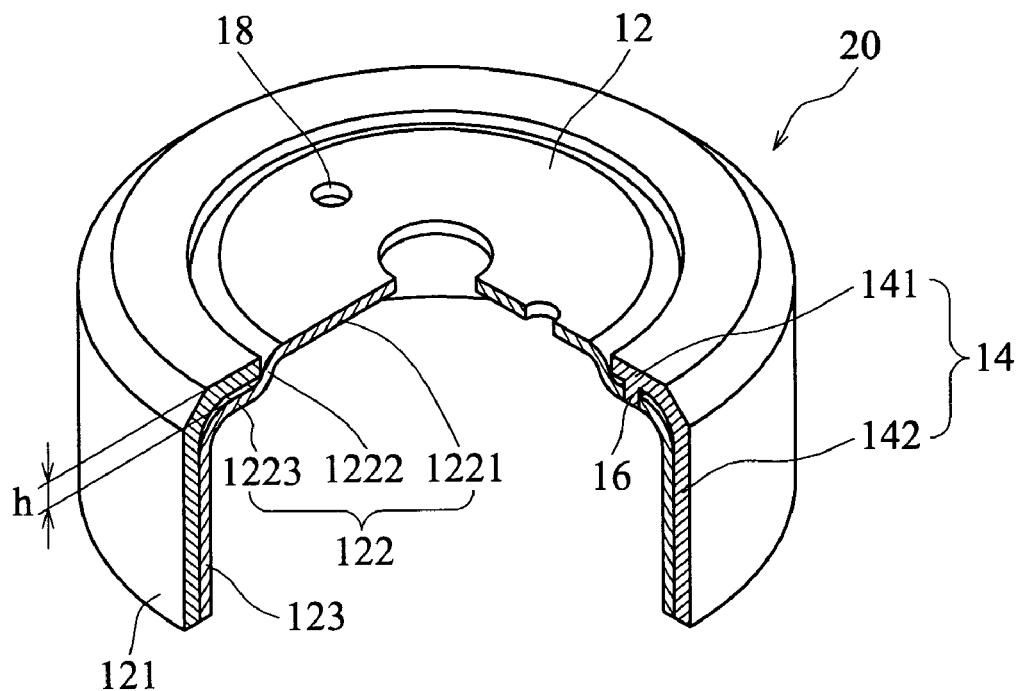
FIG. 4 is a perspective view of a rotor assembly according to another embodiment of the invention.

FIG. 4 is a perspective view of a rotor assembly 20 according to another embodiment of the invention. The rotor assembly 20 is characterized by forming a plurality of apertures 18 in the uncovered area of housing 12. Thereby, when the fan motor runs, the apertures 18 allow the air passing therethrough to induce convection flows and facilitate the heat dissipation.

Figure 5:
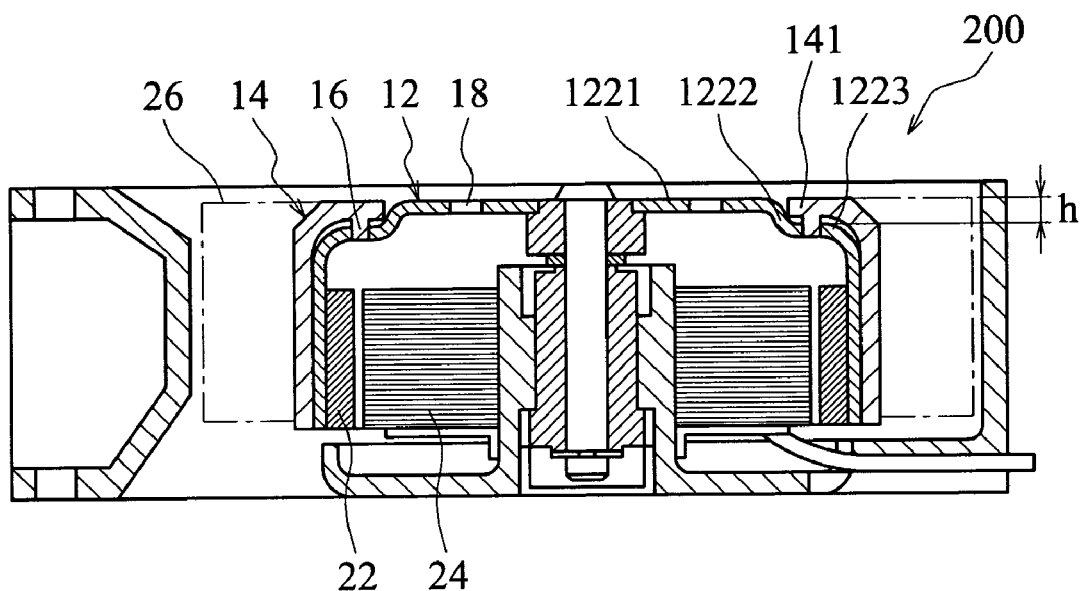
FIG. 5 is a cross-sectional view of a fan motor structure incorporating a rotor assembly according to another embodiment of the invention.

FIG. 5 is a cross-sectional view showing a fan motor 200 with the rotor assembly 20 incorporated. As shown in FIG. 5, the position section 141 can further be formed with a fastener such as a clasp 16, and the hub 14 is mounted on the housing 12 through the clasp 16 fitted in preformed bores of the periphery portion 1223. The hub 14 and the clasp 16 can be integrally formed by injection molding. The fastener is not limited to a specific form; for instance, the hub 14 and the housing 12 can be riveted together. Also, the hub 14 is not limited to a specific shape. For example, the hub 14 may be formed with a central opening and an arc leading edge as shown in FIG. 2, or an inclined leading edge for smoothly guiding the airflow in FIG. 4.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A rotor assembly comprising:
   a housing having an open end and a closed end, the closed end of the housing being formed with a raised portion in its central location to create a falling height on an inner side of the closed end;
   a hub mounting on the closed end of the housing and covering the housing except for the raised portion; and
   a plurality of blades extending from the hub and heights of upper edges of the blades are substantially equal to a height of a top surface of the hub.

2. A rotor assembly according to claim 1, wherein a height of the raised portion is substantially the same as a thickness of the hub positioned on the closed end of the housing, and wherein a height of the housing is substantially equal to the heights of the upper edges of the blades and the height of the top surface of the hub.

3. A rotor assembly according to claim 1, wherein the housing is cup-shaped.

4. A rotor assembly according to claim 1, wherein the raised portion is cup-shaped.

5. A rotor assembly according to claim 1, wherein the hub is ring-shaped and has an opening.

6. A rotor assembly according to claim 1, wherein the housing is formed with a plurality of apertures in the raised portion.

7. A rotor assembly according to claim 1, wherein the formation of the raised portion creates a stepped closed end constituted by a top portion, a shoulder and a periphery portion.

8. A rotor assembly according to claim 7, wherein the hub is fixed on the periphery portion of the housing by way of adhesion.

9. A rotor assembly according to claim 7, wherein the hub is fixed on the periphery portion of the housing through a fastener.

10. A rotor assembly according to claim 9, wherein the fastener is a clasp.

11. A rotor assembly according to claim 9, wherein the hub and the fastener are integrally formed by injection molding.

12. A rotor assembly according to claim 1, wherein the housing is made of metal.

13. A rotor assembly comprising:
    a cup-shaped housing having an open end and an opposed closed end, the closed end of the housing being formed with a raised portion in its central location, and the formation of the raised portion creating a stepped closed end comprising a top portion, a shoulder and a periphery portion to create a falling height on an inner side of the closed end;
    a hub having a position section and an extended section, the hub mounting on the cup-shaped housing through the position section covering the periphery portion of the stepped closed end; and
    a plurality of blades extending from the hub and heights of upper edges of the blades are substantially equal to a height of a top surface of the position section of the hub.

14. A rotor assembly according to claim 13, wherein a distance between the top portion and the periphery portion is substantially the same as a thickness of the position section of the hub, and wherein a height of the housing is substantially equal to the heights of the upper edges of the blades and the height of the top surface of the position section of the hub.

15. A rotor assembly according to claim 13, wherein the housing is formed with a plurality of apertures in the raised portion.

16. A rotor assembly according to claim 13, wherein the hub is fixed on the periphery portion of the housing by way of adhesion.

17. A rotor assembly according to claim 13, wherein the hub is fixed on the periphery portion of the housing through a fastener.

18. A rotor assembly according to claim 17, wherein the fastener is a clasp.

19. A rotor assembly according to claim 17, wherein the hub and the fastener are integrally formed by injection molding.

20. A rotor assembly according to claim 13, wherein the housing is made of metal.

21. A rotor assembly according to claim 13, wherein the hub is ring-shaped and has an opening and an arc or inclined leading edge for smoothly guiding an airflow passing through the rotor assembly.

* * * * *